United States Patent
Mochizuki et al.

(10) Patent No.: US 9,386,186 B2
(45) Date of Patent: Jul. 5, 2016

(54) IMAGE PROCESSING APPARATUS AND IMAGE PROCESSING METHOD PERFORMING DETECTION OF INCLINATION OF ORIGINAL IN READ IMAGE IN ACCORDANCE WITH DIRECTION OF FIBER

(71) Applicant: CANON KABUSHIKI KAISHA, Tokyo (JP)

(72) Inventors: Yugo Mochizuki, Kawasaki (JP); Takashi Nakamura, Yokohama (JP); Tetsuya Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/464,987

(22) Filed: Aug. 21, 2014

(65) Prior Publication Data

US 2015/0055876 A1 Feb. 26, 2015

(30) Foreign Application Priority Data

Aug. 26, 2013 (JP) .................................. 2013-174718

(51) Int. Cl.
*G06K 9/20* (2006.01)
*G06K 9/46* (2006.01)
*H04N 1/409* (2006.01)

(52) U.S. Cl.
CPC .................................. *H04N 1/4097* (2013.01)

(58) Field of Classification Search
None
See application file for complete search history.

(56) References Cited

U.S. PATENT DOCUMENTS

| 5,287,439 | A | 2/1994 | Koga et al. |
| 5,673,067 | A | 9/1997 | Ogawa et al. |
| 5,677,725 | A | 10/1997 | Honbo et al. |
| 5,721,812 | A | 2/1998 | Mochizuki |
| 6,608,926 | B1 | 8/2003 | Suwa et al. |
| 6,694,051 | B1 | 2/2004 | Yamazoe et al. |
| 7,432,985 | B2 | 10/2008 | Ishikawa et al. |
| 7,924,469 | B2 | 4/2011 | Ono et al. |
| 7,944,588 | B2 | 5/2011 | Yamada et al. |
| 7,983,528 | B2 | 7/2011 | Sohma et al. |
| 8,175,155 | B2 | 5/2012 | Suwa et al. |
| 8,237,991 | B2 | 8/2012 | Ono et al. |
| 2013/0271796 | A1* | 10/2013 | Landa .................... H04N 1/387 358/463 |
| 2014/0010415 | A1 | 1/2014 | Kunieda et al. |
| 2014/0010442 | A1 | 1/2014 | Kato et al. |

(Continued)

FOREIGN PATENT DOCUMENTS

JP 2001-256491 A 9/2001

OTHER PUBLICATIONS

Enomae, T., Han, Y.-H. and Isogai, A., "Nondestructive Determination of Fiber Orientation Distribution of Paper Surface by Image Analysis", Nordic Pulp and Paper Research Journal 21(2): 253-259(2006); numbered as pp. 1-18.*

(Continued)

*Primary Examiner* — Brian P Werner
(74) *Attorney, Agent, or Firm* — Fitzpatrick, Cella, Harper & Scinto

(57) ABSTRACT

An image processing apparatus accurately determines the inclination of an original even in the case where an original of a white sheet is read with a white sheet as a background. For this, the image processing apparatus extracts a fiber section having a feature of paper fiber from image data, analyzes a direction of fiber in the fiber section, and calculates the inclination of an original at the time of reading the original based on the direction.

18 Claims, 10 Drawing Sheets

(56) References Cited

U.S. PATENT DOCUMENTS

2014/0010450 A1 1/2014 Suwa et al.
2014/0198354 A1 7/2014 Akiba et al.

OTHER PUBLICATIONS

U.S. Appl. No. 14/464,944, filed Aug. 21, 2014.

* cited by examiner

IMAGE PROCESSING APPARATUS AND IMAGE PROCESSING METHOD PERFORMING DETECTION OF INCLINATION OF ORIGINAL IN READ IMAGE IN ACCORDANCE WITH DIRECTION OF FIBER

BACKGROUND OF THE INVENTION

1. Field of the Invention

The present invention relates to an image processing apparatus for performing predetermined processing on a read image acquired by a reading device reading an original, and an image processing method.

2. Description of the Related Art

An image reading device (scanner) for optically reading a written original and a photo and converting a read image into electronic data is widely used. A number of such image reading devices are provided not only as a single device, but also as a multifunction peripheral, such as a copying machine integrated with a printing device and a facsimile integrated with a transmission/reception function. Further, in recent years, various image processing methods have been proposed for electronic data that is read, such as the OCR (Optical Character Recognition) technique and the technique of PDF file conversion. At this time, it is regarded as important to accurately grasp, in particular, the directional properties of a read original.

For example, Japanese Patent Laid-Open No. 2001-256491 discloses the technique to read an original together with a background whose color data is known in advance and to acquire an inclination of the read original as well as separating the background and the region of the original and to correct the inclination.

By using the technique such as this described in Japanese Patent Laid-Open No. 2001-256491, even in the case where an original is oriented with an inclination, it is possible to perform OCR processing or carry out conversion into a PDF file after correcting the orientation of the original represented by electronic data, and therefore, it is made possible to efficiently acquire character information.

However, in recent image reading devices, it is common to utilize a white sheet having a high degree of whiteness as a background of an original. The reason is that ink or toner is prevented from being consumed wastefully for the region to be read other than the original at the time of printing the image after that. On the other hand, sheets used as an original include recycled paper recycled from waste paper and the degree of whiteness of the recycle paper increases year after year and has become substantially the same as that of the high-quality paper. Then, in the state where an original whose degree of whiteness is high is read together with a white sheet whose degree of whiteness is also high as a background as described above, it becomes difficult to separate the original and the background based on the difference in color data and to extract the edge of the original as described in Japanese Patent Laid-Open No. 2001-256491.

SUMMARY OF THE INVENTION

The present invention has been made in order to solve the above-described problems and an object thereof is to provide an image processing apparatus capable of accurately determining a region corresponding to an original in the read image of the original.

According to a first aspect of the present invention, there is provided an image processing apparatus comprising: an acquisition unit configured to acquire a read image acquired by a reading device reading an original; a specifying unit configured to specify a region having a fiber feature from a read image by analyzing the read image acquired by the acquisition unit; and a performing unit configured to perform a predetermined processing on the read image based on the region specified by the specifying unit.

According to a second aspect of the present invention, there is provided an image processing method comprising: an acquisition step of acquiring a read image acquired by a reading device reading an original; a specifying step of specifying a region having a fiber feature from a read image by analyzing the read image acquired in the acquisition step; and a performing step of performing a predetermined processing on the read image based on the region specified in the specifying step.

In a third aspect of the present invention, there is provided a non-transitory computer readable storage medium storing a program for causing a computer to perform as the image processing apparatus according to the first aspect.

Further features of the present invention will become apparent from the following description of exemplary embodiments (with reference to the attached drawings).

DESCRIPTION OF THE EMBODIMENTS

Hereinafter, with reference to drawings, preferred embodiments of the present invention are explained in detail in an illustrative manner.

First Embodiment

Figure 1A:
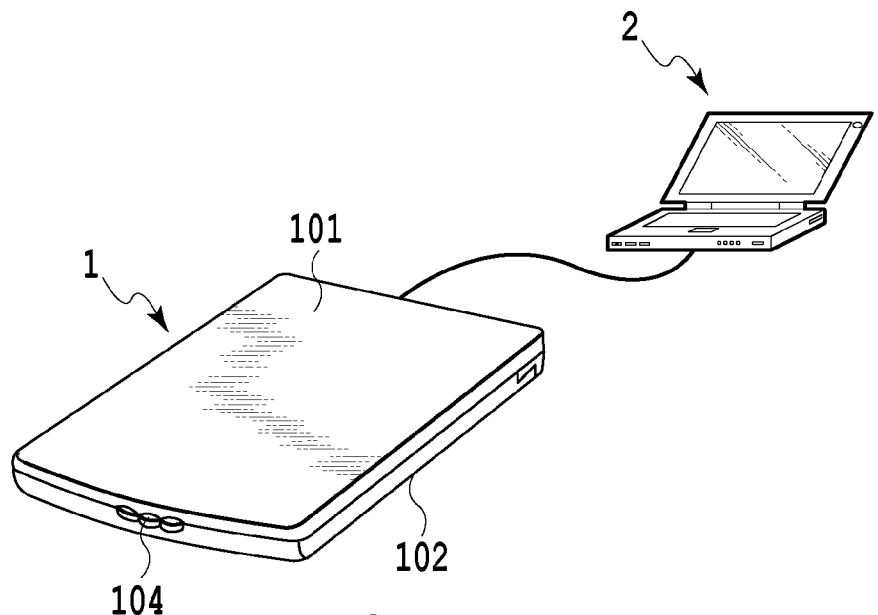
FIGS. 1A and 1B are each a configuration diagram of an image processing apparatus and a perspective view of a reading device.
Figure 1B:
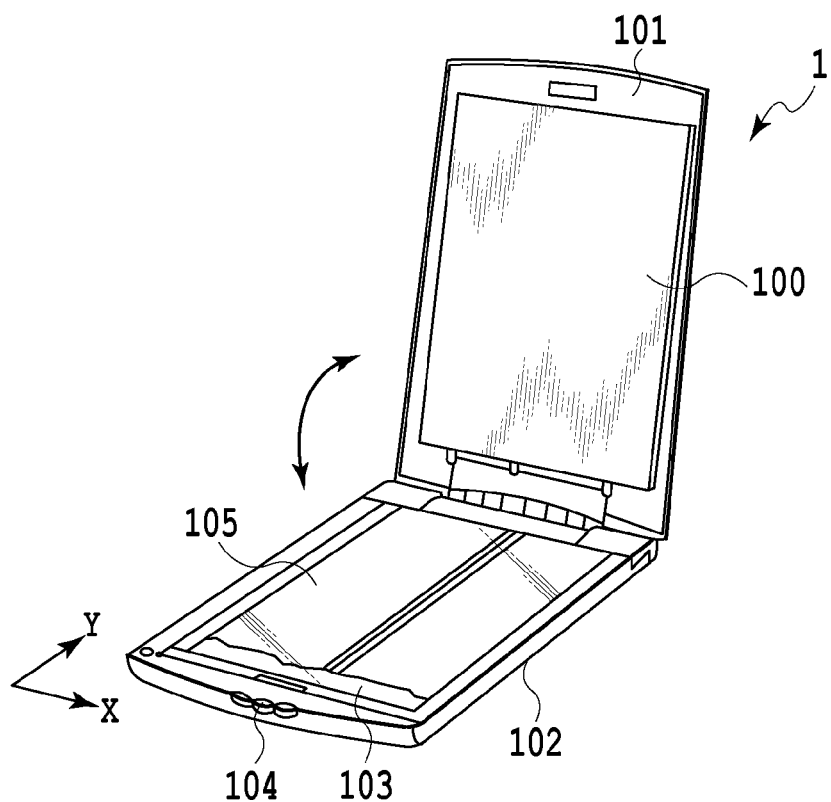

FIGS. 1A and 1B are each a configuration diagram of an image processing apparatus of the present embodiment and a perspective view of an outline of a reading device 1. As shown in FIG. 1A, the image processing apparatus of the present embodiment includes the reading device 1 configured to read an original and a host device 2 configured to process image data received from the reading device 1.

Referring to FIG. 1B, an original is placed on a glass plate 105 of an original table 102 so that the surface to be read of the original comes into contact with the glass plate 105. An original cover 101 to which a white sheet 100 is bonded rotates in the direction of an arrow and presses the original surface against the glass plate of the original table 102. A scan unit 103 is configured by arraying a plurality of optical elements in an X-direction and scans an original by using these optical elements while moving in a Y-direction by a motor, not shown. An operation unit 104 is a user interface for a user to give instructions to start or abort the scanning operation and has button keys that can be pressed down.

Figure 2:
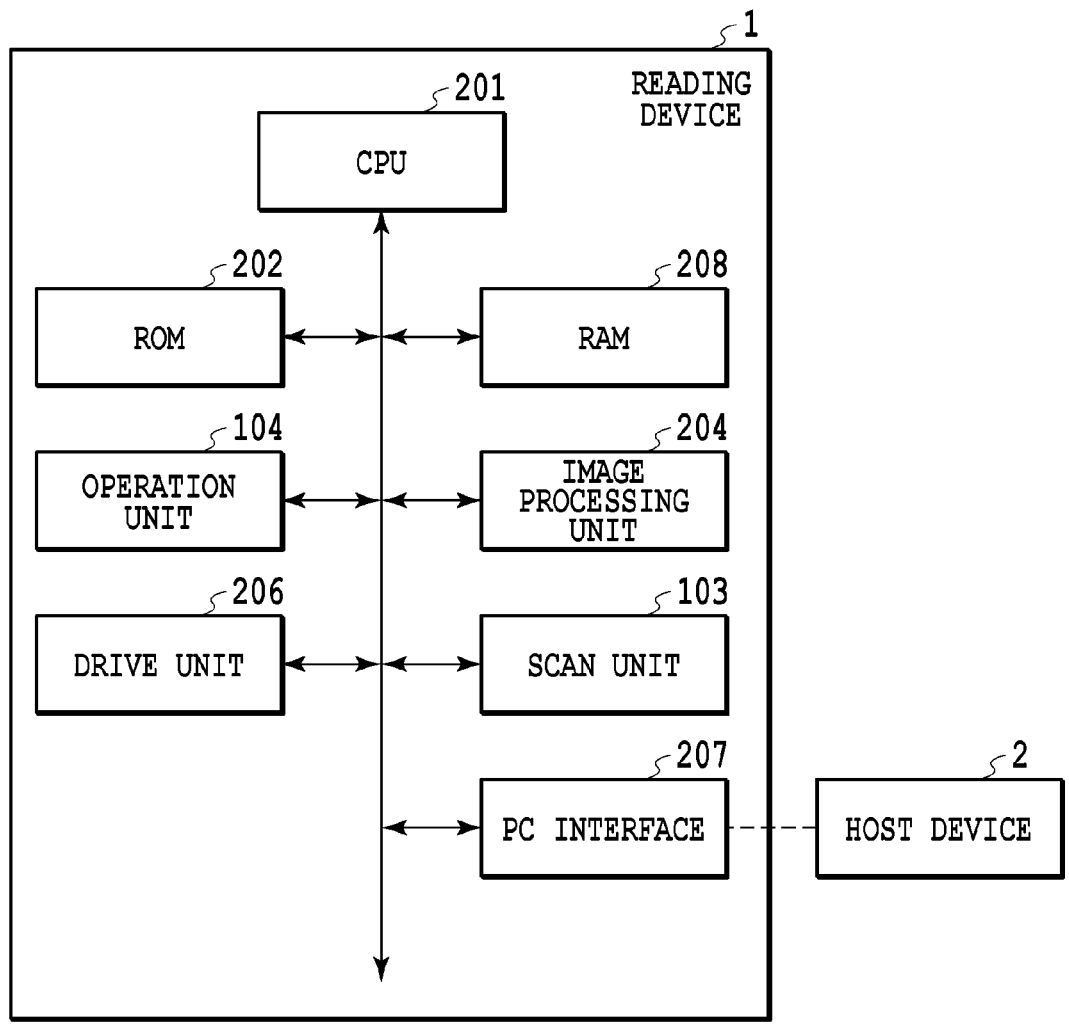
FIG. 2 is a block diagram for illustrating a configuration of control of the reading device.

FIG. 2 is a block diagram for illustrating a configuration of control of the reading device 1. A CPU 201 controls the whole of the device by using a RAM 208 as a work area in accordance with programs stored in a ROM 202. For example, programs corresponding to the processing in flowcharts shown in FIGS. 4, 5, and 9, to be described later, are stored in the ROM 202 and the processing illustrating in these flowcharts can be implemented by the CPU 201 executing the programs. Further, in the ROM 202, besides the above-described programs, various parameters, such as parameters necessary for shading processing, to be described later, mathematical expressions, etc., are stored. A plurality of optical elements arrayed in the scan unit 103 detects analog luminance signals of red (R), green (G), and blue (B). The scan unit 103 converts these signals into digital signals by using an AD conversion circuit and then transfers the digital signals to an image processing unit 204. The image processing unit 204 performs various kinds of processing on the received digital luminance signal under instructions of the CPU 201. The detailed contents of the processing will be described later. A drive unit 206 includes a motor, a driver circuit, etc., for causing the scan unit 103 to scan in the Y-direction in FIG. 1B and drives these under the instructions of the CPU 201. A PC interface 207 is an interface for performing transmission and reception of data with the host device 2.

Figure 3:
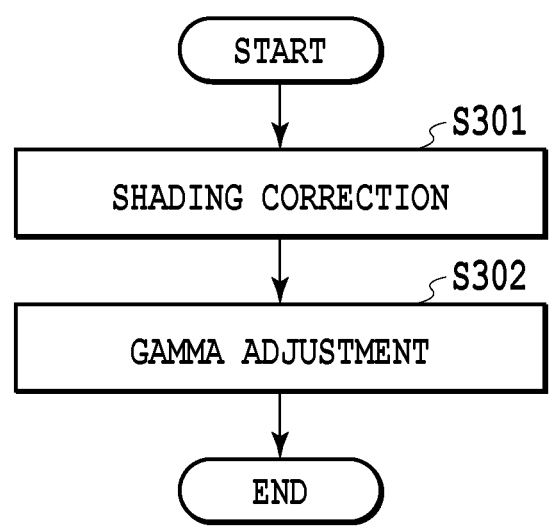
FIG. 3 is a flowchart for illustrating processes of image processing performed by an image processing unit.

FIG. 3 is a flowchart for illustrating processes of image processing performed by the image processing unit 204 under instructions of the CPU 201. The present processing is started by the scan unit 103 performing the scanning operation and transmitting a digital luminance signal corresponding to one page to the image processing unit 204. At this time, the image processing unit 204 performs, first at step 5301, shading processing to correct variations in detection of the optical elements. Specifically, correction coefficients are found from the detection result at the time of causing each individual optical element to read the same white reference and the same black reference, and each individual piece of digital luminance data is corrected by using the correction coefficients. These correction coefficients may be stored in the ROM 202 in advance or may be updated with predetermined timing.

At step S302 that follows, the image processing unit 204 performs gamma correction to tune the gradation characteristics of the optical element to visual gradation characteristics. Specifically, by referring to a one-dimensional lookup table stored in the ROM 202 in advance or by using a calculation expression, the multivalued digital luminance signals RGB are converted into multivalued digital luminance signals R'G'B'. After the gamma correction at step 5302 is completed, the image processing by the image processing unit 204 ends and the CPU 201 transfers these multivalued digital luminance signals R'G'B' to the host device via the PC interface 207. At this time, in order to reduce the amount of data at the time of transfer, it is also possible to interpose a publicly-known compression processing. Further, it is also possible to determine whether or not compression processing is necessary in accordance with the transfer rate of the PC interface 207.

Figure 4:
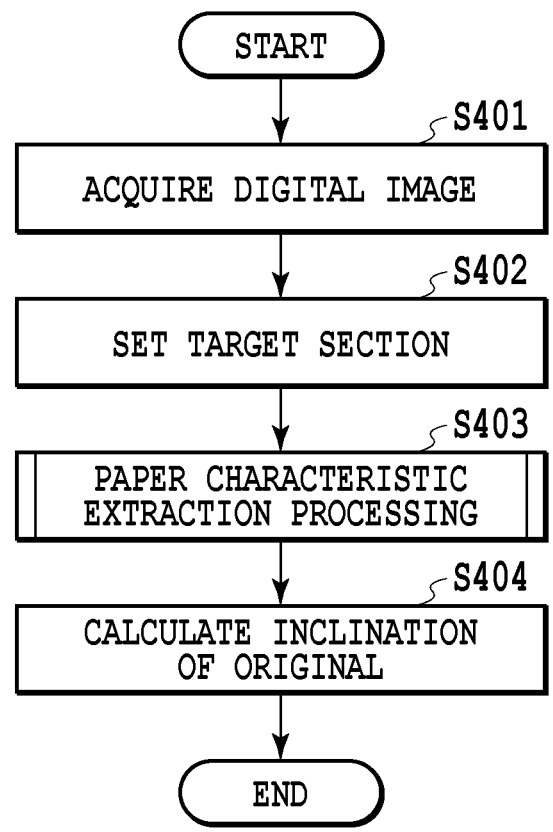
FIG. 4 is a flowchart showing a sequence to acquire an original inclination performed by a host device.

FIG. 4 is a flowchart showing an original inclination acquisition sequence for acquiring an inclination of the original read by the reading device 1 performed by the host device 2 of the present embodiment. In the case where the present processing is started, the host device 2 receives the digital luminance signals R'G'B' output from the PC interface as image data (step S401). At this time, in the case where the received data is data compressed by the image processing unit 204, the host device 2 also performs decoding processing of the data. The reading device 1 reads a predetermined region of the original table 102 (e.g., the entire surface of the original table 102). Because of this, in the read image corresponding to the image data acquired at step S401, the original region corresponding to the original and the region corresponding to other than the original (white sheet 100) may be included.

At step S402, the received entire image region corresponding to one page is searched and target sections are set. A target section is a section to be subjected to a paper characteristic detection analysis, to be described later, and basically, all the regions having a luminance signal value close to that of white data are set. Specifically, by gradually moving a unit region having a predetermined size (n pixels×n pixels) in the entire image region, all the regions where the average luminance signal values within the unit region are higher than respective threshold values of RGB are selected. At this time, it may also be possible to calculate the averages of the luminance signal values at each position while moving a unit region in units smaller than n pixels and to determine whether or not the region can be the target section at each position. By the processing at step S402, it is possible to set the candidate of the region corresponding to the color of the sheet itself as the above-described target section by excluding the region corresponding to a color different from the color of the sheet itself on which the image to be printed is printed, for example, such as the region of a color photo printed on the sheet.

Figure 5:
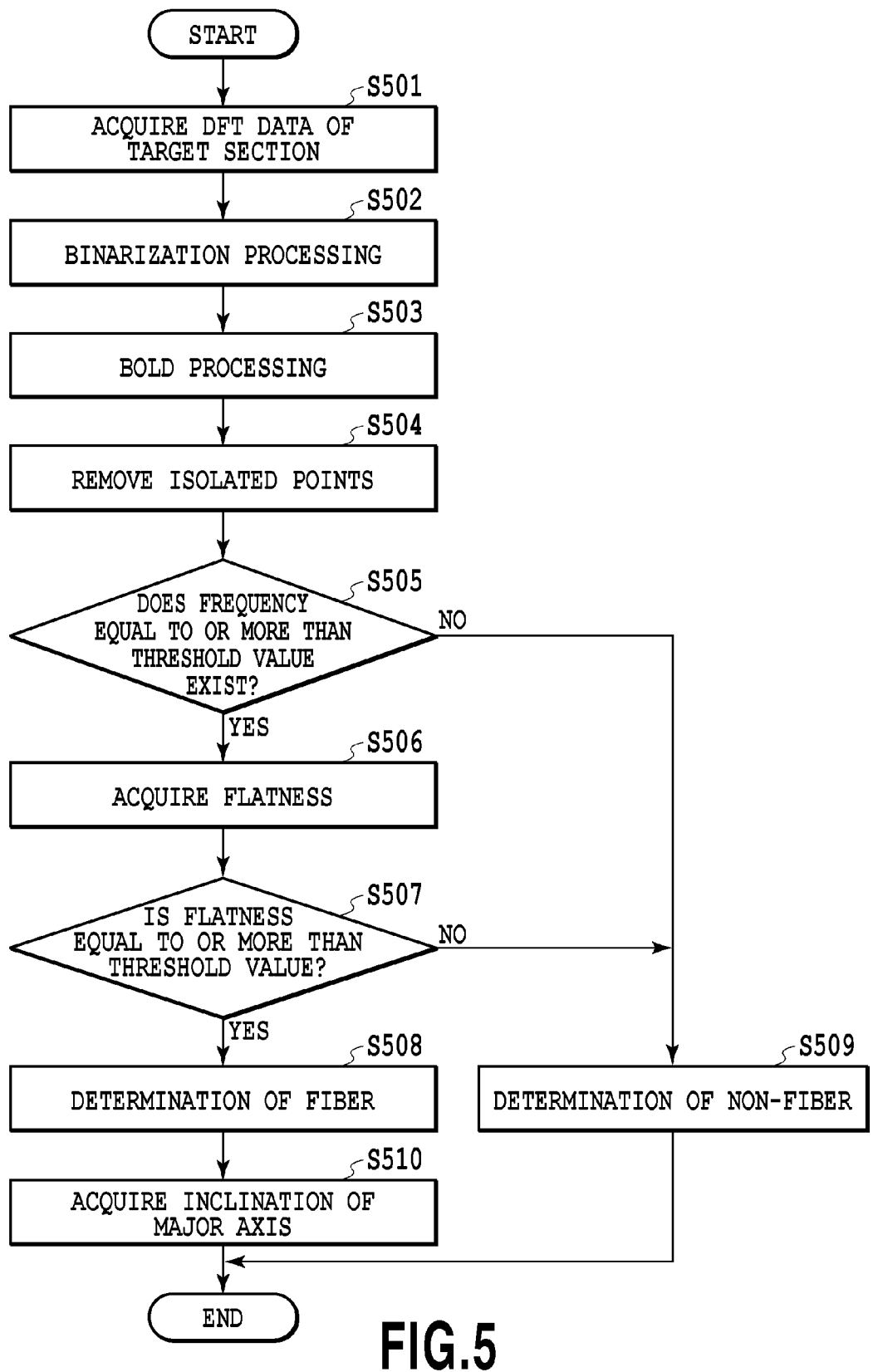
FIG. 5 is a flowchart for explaining processes of paper characteristic extraction processing.

At step S403 that follows, the paper characteristic extraction processing, characteristic of the present invention, is performed on each target section set at step S402. FIG. 5 is a flowchart for illustrating the processes of the paper characteristic extraction processing performed by the host device 2 at step S403 for one target section. FIGS. 6A to 6E are diagrams showing states after the spatial frequency distribution of the target section of interest is processed in accordance with each process in FIG. 5. Hereinafter, with reference to FIGS. 6A to 6E, the paper characteristic extraction processing is explained in accordance with the flowchart in FIG. 5.

Figure 6A:
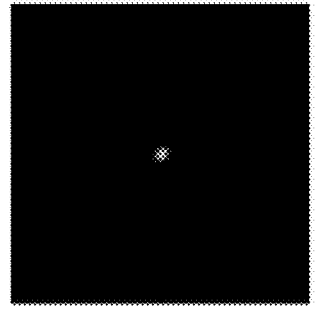
FIGS. 6A to 6E are diagrams each showing a spatial frequency distribution of a target section of interest.

After the present processing is started, the host device 2 first carries out a two-dimensional discrete Fourier transformation (hereinafter, referred to as DFT) on each target section and acquires a two-dimensional spatial frequency distribution at step S501. FIG. 6A is a diagram showing an example of the spatial frequency distribution obtained at step S501. In FIG. 6A, the horizontal axis represents the frequency component in the X-direction in FIG. 1B and the vertical axis represents the frequency component in the Y-direction, respectively, and the frequency component becomes higher as it becomes more distant from the origin in both the directions. At each coordinate (pixel position), it is indicated that as the color becomes closer to white from black, the power of the frequency component indicated by the coordinate becomes stronger.

Figure 6B:
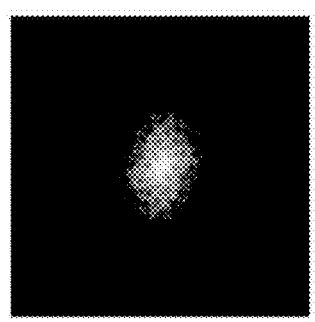

At step S502 that follows, the host device 2 performs binarization processing on the spatial frequency distribution obtained at step S501. As a threshold value for binarization at this time, a value prepared in advance may be used or the threshold value may be found from an average value of image signals. By the binarization processing, each coordinate in the spatial frequency distribution is set to black (0) or white (1). FIG. 6B shows a state after binarization processing is performed on the spatial frequency distribution in FIG. 6A.

Figure 6C:
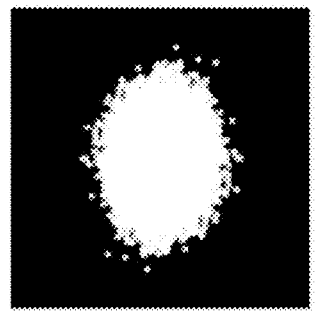

At step S503, the host device 2 performs bold processing on the spatial frequency distribution after being subjected to the binarization processing obtained at step S502. Specifically, with the coordinate set to white (1) as a center, the region of the several pixels surrounding the coordinate is set to white (1) forcibly. FIG. 6C shows the result of performing five-pixel bold processing on the spatial frequency distribution in FIG. 6B.

Figure 6D:
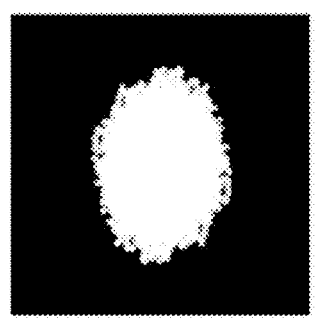

At step S504, the host device 2 removes isolated points from the spatial frequency distribution after the bold processing obtained at step S503. As is seen in FIG. 6C, it is known that white isolated points exist sporadically in the black region in the spatial frequency distribution after the bold processing. The host device 2 searches for such a region and changes the data thereof into black (0) data. Specifically, the host device 2 searches for a white (1) region having a predetermined area or more and replaces the data thereof with black (0) data. FIG. 6D shows the result of replacing the data of the region where 350 or more consecutive pixels indicate white (1) data with black (0) data in the spatial frequency distribution in FIG. 6C.

At step S505 to S508 below, whether the spatial frequency distribution after isolated points are removed has a characteristic feature of a sheet (paper fiber) is analyzed.

Here, the feature of a sheet is explained specifically. In general, the raw material of a sheet is wood chips and coarse fiber is removed first in the pulping process and after that, through the cleaning and bleaching processes, the paper making process is performed. In the paper making process, the remaining fine fiber is imparted with directional properties by being placed side-by-side with a wire part and a press part. As a result, the sheet has the feature of grain, such as crosswise grain or lengthwise grain. Although depending on the kind of the material wood, the general size of fiber is about tens of micrometers to 1 to 3 mm. In other words, the feature of a sheet is that fine lines are put side by side in a particular direction so as to possess directional properties. Then, in most cases, the roll paper thus manufactured is cut vertically or horizontally with respect to the conveyance direction or width direction and cut paper of a fixed size, such as A4 and B5, is manufactured. Because of this, the sheet of fixed size has fiber with lengthwise grain or crosswise grain with respect to the cut surface. As a summary of the above, in the case where the DFT processing is performed on image data obtained by scanning the white-paper region of a sheet, it can be said that the spatial frequency distribution thereof has features below.

Feature 1: The fiber appears as fine lines, and therefore, power is detected in high frequency components of an image thereof.

Feature 2: The fine lines of the fiber extend in the same direction so as to have directional properties, and therefore, directivity occurs in the power spectrum.

Feature 3: Directivity appears in the direction vertical or horizontal to the orientation of rectangular paper.

In view of the above, at steps S505 to S508, whether the acquired spatial frequency distribution has the characteristic feature of a sheet (paper fiber) is analyzed. First, at step S505, the host device 2 analyzes the spatial frequency distribution obtained at step S504 and determines whether or not power appears in the frequency component that is equal to or more than a predetermined threshold value (high frequency component). Whether or not power appears in the high frequency component can be checked by determining whether or not white data exists at a position a predetermined distance or more away from the origin by referring to FIG. 6D. Then, in the case where power appears in the frequency component that is equal to or more than the predetermined value (high frequency component), this fact is taken as an indication that the original possesses the above-described feature 1, and therefore, the host device 2 determines there is a possibility that the target section is a fiber section (on the sheet) and proceeds to step S506.

Figure 8:
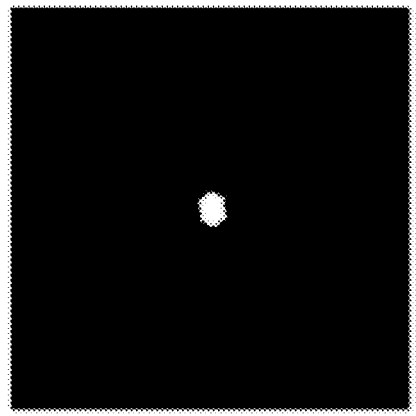
FIG. 8 is a diagram showing a spatial frequency distribution in the case where the target section is a white sheet region.

On the other hand, in the case where no power appears in the frequency component equal to or more than the predetermined value, the host device 2 proceeds to step S509 and determines that the target section is a non-fiber section (on the sheet) and exits the present processing. FIG. 8 is a diagram showing the spatial frequency distribution obtained as the result of performing the processes at step S501 to step S504 on the section in the case where the target section of interest is the white sheet 100 region outside the original. The white sheet 100 region does not have fiber that a paper has, and therefore, a high value of the spatial frequency is not acquired and the frequency components centralize at low frequencies as shown in FIG. 8. Because of this, it is known that the region in which white data exists forms a small region in the vicinity of the origin compared to FIG. 6D and power spectra of the high frequency components are smaller. At step S505, such a section is determined to be a non-fiber section.

Figure 6E:
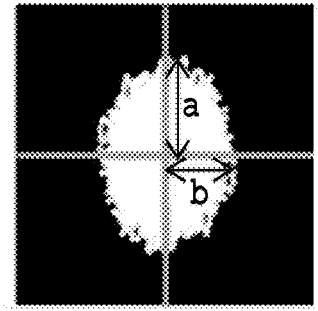

At step S506, the host device 2 analyzes the spatial frequency distribution and calculates the flatness of the power spectrum existent region. Specifically, with reference to FIG. 6E, the white region is approximated to an ellipse and the numbers of pixels of the major axis length (a) and the minor axis length (b) are counted, respectively. FIG. 6E shows the case where the ellipse has a major side parallel to the Y-axis and a minor side parallel to the X-side. After that, the flatness f is calculated in accordance with the expression below.

$$f=(a-b)/a$$

Further, at step S507, whether or not the flatness f found at step S506 is equal to or greater than a predetermined threshold value Tf is determined. Here, in the case where f >Tf, it can be said that the power spectrum has directivity and has the above-described feature 2. Consequently, the host device 2 proceeds to step S508 and determines that the target section is a fiber section (on the sheet) because it possesses the above-described feature 1 and feature 2. On the other hand, in the case where f ≤Tf, no directivity is recognized in the power spectrum, and therefore, the host device 2 proceeds to step S509 and determines that the target section is not a fiber section (on the sheet), and exits the present processing.

Figure 7:
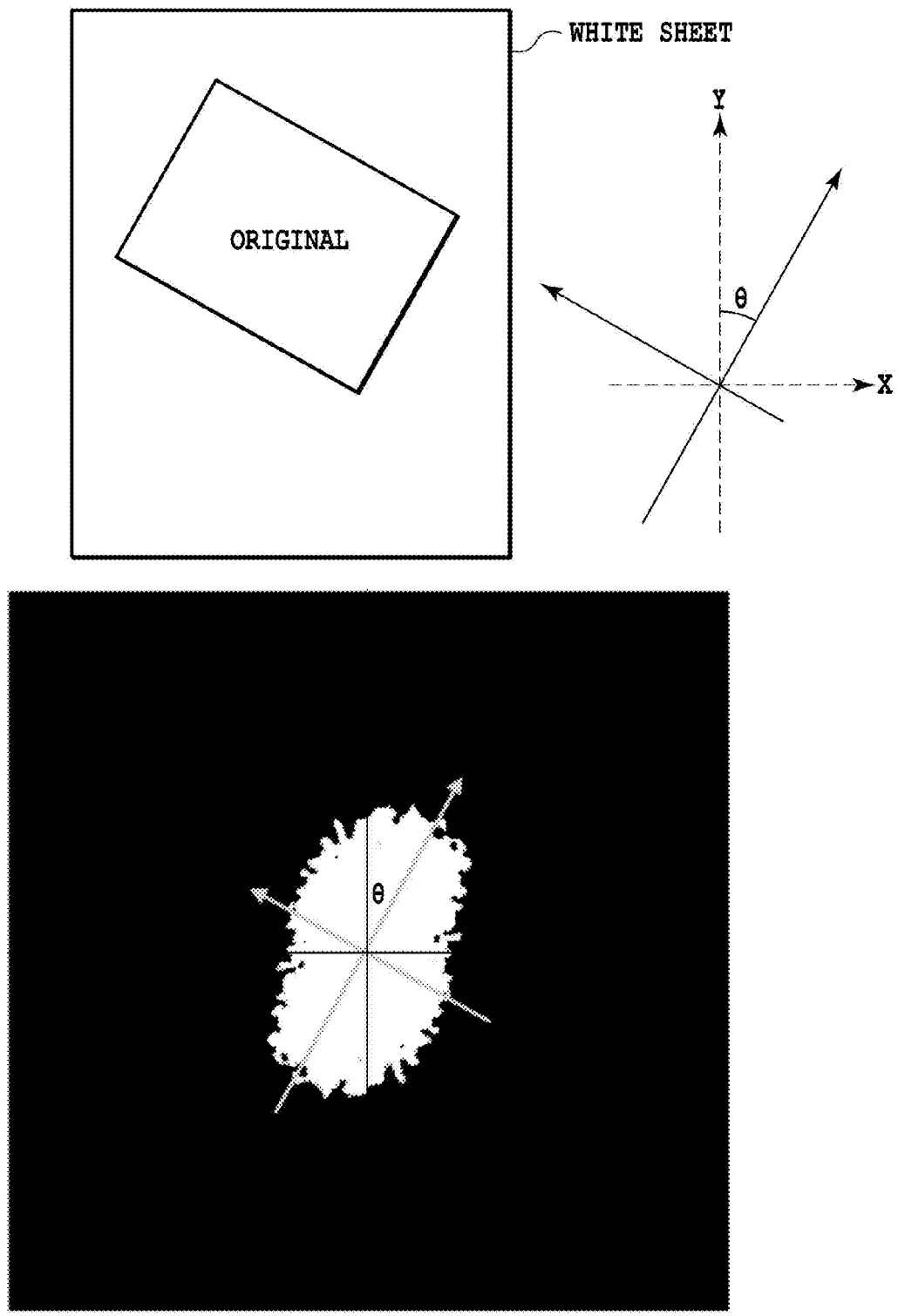
FIG. 7 is a diagram showing another example of the spatial frequency distribution.

At step S510, the host device 2 analyzes the spatial frequency distribution and acquires the inclination of the major axis with respect to the X-axis or the Y-axis. In the case of FIG. 6E, the inclination is 0°. On the other hand, in the case where the spatial frequency distribution such as in FIG. 7 is obtained by the processing at step S501 to step S504, the inclination will be θ.

As above, by performing the paper characteristic extraction processing explained by using FIG. 5, whether each target section is a non-fiber section or a fiber section is determined and in the case of the fiber section, the direction of fiber is further determined.

In the example in FIG. 5, the region corresponding to the color of the sheet itself is specified in the read image of an original and it is determined that the region has a fiber characteristic (YES at S505), and after the direction of fiber of the region is further determined (the result at S507 is YES), it is determined that the region is on the sheet. However, the determination method is not limited to this and it may also be possible to determine that the region is on the sheet at the point of time of determination that the above-described region has a fiber characteristic (YES at S505).

The discussion returns now to the flowchart in FIG. 4. In the case where the paper characteristic extraction processing of each target section ends at step S403, the host device 2 proceeds to step S404 and calculates an inclination of the original. The cut sheet of the original has the above-described feature 3, and therefore, the inclination Θ of the original substantially agrees with the inclination Θ of the major axis in each section regarded as being a fiber section. Consequently, at step S404, an average of the inclinations Θ of all the sections regarded as being a fiber section is found and this is taken to be the inclination Θ of the original. As above, the present processing is completed.

According to the present embodiment explained as above, it is possible to determine the inclination at the time of the original being placed by extracting the white-paper region of the sheet as a fiber section and by detecting the direction of fiber. Consequently, in the subsequent processing, it is possible to effectively perform various kinds of image processing, such as OCR, by taking into consideration the inclination of the image.

(Second Embodiment)

In the present embodiment also, as in the first embodiment, the image processing apparatus explained in FIG. 1A, FIG. 1B and FIG. 2 is used. Further, it is assumed that the process of the image processing performed by the image processing unit 204 of the image reading device 1 and the paper characteristic extraction processing performed by the host device 2 are also in accordance with the flowcharts shown in FIG. 3 and FIG. 5. However, in the present embodiment, after the host device 2 acquires the inclination Θ of an original, the orientation of the original is automatically corrected based on this.

Figure 9:
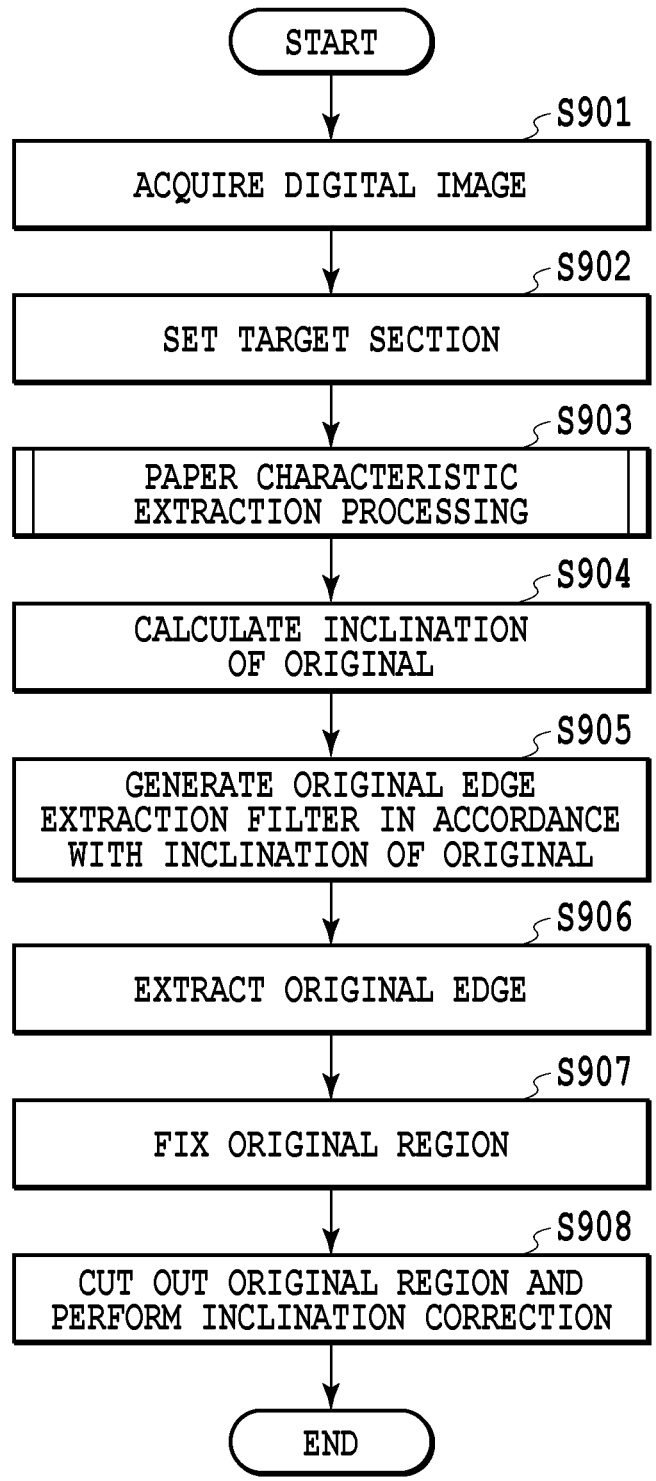
FIG. 9 is flowchart for illustrating an original inclination acquisition and correction sequence.

FIG. 9 is a flowchart for illustrating processes of an original inclination acquisition and correction sequence performed by the host device 2 of the present embodiment.

Step S901 to step S904 correspond to step S401 to step S404 explained in the discussion of FIG. 4, and therefore, an explanation thereof is omitted here.

At step S905, the host device 2 optimizes an original edge extraction filter based on the inclination Θ of the original acquired at step S904. The original edge (i.e., the cut side of the cut paper) is substantially parallel or vertical to the inclination Θ of the original, and therefore, the host device 902 selects a filter most suitable to the inclination Θ. At this time, it may also be possible to select a filter from filters of various angles prepared in advance or to newly produce a filter by calculating an optimum filter coefficient from the inclination Θ. After that, at step S906, the host device 2 extracts the original edges of the four sides by using the filter obtained by selection or production as above at step S905.

Figures 10A, 10B, 10C:
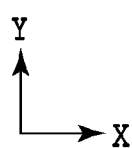
FIGS. 10A to 10C are diagrams each showing an example of an original extraction filter.

For example, referring to FIG. 7, in the case where the inclination Θ of the original is 40°, as in FIG. 10A, it is preferable for a filter easily extracting only an edge in the 45° direction to be selected at step S905. Further, in the case where it is desired to further optimize the coefficient, it may also be possible to create a filter for which an optimum coefficient is determined by weighting each pixel as in FIG. 10B. In the case where a Laplacian filter in which the same coefficient is provided in all the directions as in FIG. 10C is used, there is a possibility that dust outside the original or irregularities are detected as an original edge at step S906. However, in the case where the weights of the coefficients in the directions parallel or vertical to the inclination Θ of the original, i.e., in the directions in which the probability that the sheet edge exists is high, are set to be heavy, it is possible to detect the actual sheet edge in a state where accuracy is high at step S906. However, even in the case where the Laplacian filter as in FIG. 10C is used, it is also possible to improve the detection accuracy of detecting the sheet edge by performing, after extracting a plurality of sheet edges at step S906, processing to extract only the sheet edges that can be connected only in the direction of the inclination Θ of the original therefrom and to connect these sheet edges. In FIGS. 10A to 10C, the size of the filter is set to 3 pixels×3 pixels, but this is not limited.

The discussion now returns to the flowchart in FIG. 9. At step S907, the host device 2 calculates the positions of four vertexes from the original edges acquired at step S906 and fixes the original region. After that, at step S908, only the original region fixed at step S907 is extracted from the image data acquired at step S901 and rotation processing is performed on the image data of the original region. As the inclination correction made at step S908, it is sufficient to adopt the generally-known method using geometric linear interpolation. With the above, the present process is completed.

According to the present embodiments explained as above, it is possible to determine the inclination of an original being placed and to generate image data in which the inclination is corrected. Consequently, in the subsequent image processing, it is possible to perform appropriate processing in the correct direction without the need to take the inclination of the image into consideration.

In the embodiments explained as above, the processing at step S502 to step S504 of the paper characteristic extraction processing is performed in order to ensure the analysis after step S505 and is not necessarily required. As long as the frequency analysis after step S505 is performed effectively, the processing may be changed in any way or may be deleted.

Further, in the above-described embodiments, an explanation is given on the assumption that the size of the target section in the read image, for which whether or not it is on the sheet is determined, is (n pixels×n pixels). It is preferable for the size n to be adjusted in accordance with the resolution of the image read by the reading device 1. Specifically, the resolution of the image is 500 ppi (pixel/inch) or more, preferably, 1,200 ppi or more. In the case where the image resolution is 1,200 ppi, the size of one pixel is about 20 μm. At this time, it is sufficient for the size n of the target section to be about 100 pixels. In the case where the image resolution is about 500 ppi, the size of one pixel is about 50 μm. At this time, it is sufficient for the size n of the target section to be about 50 pixels.

As described above, in the case where "n" of the above-described target section is adjusted, for example, the value of n is dynamically changed in accordance with the set resolution in reading. For example, it may also be possible to store "n" corresponding to each of a plurality of resolutions that can be set in the reading device in the memory (e.g., ROM 202) within the reading device in association with the resolution and to read "n" in accordance with the resolution set at the time of reading from the above-described memory.

In the above embodiments, in order to detect the inclination of an original, whether the target section is on the sheet is determined. However, this is not limiting and, for example, it may also be possible to apply the processing in the above embodiment in order to specify the region corresponding to the original in the read image.

For example, as shown in FIG. 9, in the case where the original region corresponding to the original is cut out from the read image of the original, whether the target section is on the sheet may be determined. In the example in FIG. 9, the above-described original region is specified by detecting the original edge in the read image. However, there is a case where it is not possible to appropriately detect the original edge because of the thickness of the original and light that enters from the outside of the reading device at the time of reading of the original. Because of this, as shown in the above-described embodiment, it may also be possible to specify the original region in the read image by determining whether or not the target section is on the sheet depending on whether or not the target section has a fiber characteristic on the sheet.

Further, in the above, explanation is given by using the image processing apparatus shown in FIG. 1A as an example, but the image processing apparatus of the present invention may not necessarily be configured by the reading device and the host device. In the case where the original inclination acquisition processing characteristic of the present invention is performed by the CPU of the reading device, the reading device (scanner) will serve as the image processing apparatus of the present invention. Further, even according to an aspect in which the host device is not connected with the reading device and acquires the image read by the reading device via a USB memory or CD-R, in the case where the above-described original inclination acquisition processing is performed by the host device, the host device will serve as the image processing apparatus of the present invention.

It is also possible to implement the functions of the above-described embodiments by configurations below. In other words, the functions are achieved also by supplying program codes for performing the processing of the present embodiments to a system or a device and by a computer (or CPU or MPU) of the system or the device executing the program codes. In this case, the program codes themselves read from a storage medium implement the functions of the above-described embodiments as a result, and further, the storage medium storing the program codes also implements the functions of the present embodiments.

Further, there may be a case where the program codes for implementing the functions of the present embodiments are executed by one computer (CPU, MPU) or there may be a case where they are executed by a plurality of computers in cooperation with one another. Furthermore, there may be a case where the program codes are executed by a computer, or hardware, such as a circuit, for implementing the functions of the program codes may be provided. Alternatively, there may be a case where part of the program codes are implemented by hardware and the rest is executed by a computer.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-174718, filed Aug. 26, 2013, which is hereby incorporated by reference herein in its entirety.

What is claimed is:

1. An image processing apparatus comprising:
a storage medium configured to store program codes; and
one or more processors configured to execute the program codes stored in the storage medium,
wherein the one or more processors function as:
an acquisition unit configured to acquire a read image acquired by a reading device reading an original;
a specifying unit configured to specify a region having a fiber feature from a read image by analyzing the read image acquired by the acquisition unit, and to specify a direction of fiber in the specified region; and
a performing unit configured to perform detection of the inclination of the original in the read image in accordance with the direction of the fiber specified by the specifying unit.

2. The image processing apparatus according to claim 1, wherein the one or more processors as the performing unit further performs rotation processing of the read image based on the inclination detected by the detection operation of the performing unit.

3. The image processing apparatus according to claim 2, wherein the one or more processors as the performing unit cuts out an image corresponding to a region corresponding to the original from the read image and performs the rotation processing on the cut-out image.

4. The image processing apparatus according to claim 3, wherein the one or more processors as the performing unit cuts out an image of a region corresponding to the original by extracting an original edge of the original by using an original edge extraction filter corresponding to the inclination.

5. The image processing apparatus according to claim 1, wherein the one or more processors as the performing unit specifies a region corresponding to the original in the read image.

6. An image processing apparatus comprising:
a storage medium configured to store program codes; and
one or more processors configured to execute the program codes stored in the storage medium,
wherein the one or more processors function as:
an acquisition unit configured to acquire a read image acquired by a reading device reading an original;
a specifying unit configured to specify a region in which the luminance is higher than a predetermined luminance, which corresponds to a frequency component equal to or greater than a predetermined frequency, and in which the flatness of a power spectrum existent region is equal to or greater than a predetermined threshold value, from the read image acquired by the acquisition unit, and to specify a direction of fiber in the specified region, and
a performing unit configured to perform predetermined processing on the read image based on the specified direction of the fiber in the region specified by the specifying unit.

7. The image processing apparatus according to claim 1, further comprising an image reading device for reading the original,
wherein the one or more processors as the acquisition unit acquires the read image read by the image reading device.

8. An image processing method comprising:
an implementing step of implementing a process by one or more processors by executing program codes stored in a storage medium,
wherein the process includes:
an acquisition step of acquiring a read image acquired by a reading device reading an original;
a specifying step of specifying a region having a fiber feature from a read image by analyzing the read image acquired in the acquisition step, and specifying a direction of fiber in the specified region; and
a performing step of performing detection of the inclination of the original in the read image in accordance with the direction of the fiber specified in the specifying step.

9. The image processing method according to claim 8, wherein in the performing step in the process implemented in the implementing step by the one or more processors, rotation processing of the read image is further performed based on the inclination detected by the detection operation in the performing step.

10. The image processing method according to claim 9, wherein in the performing step in the process implemented in the implementing step by the one or more processors, an image corresponding to a region corresponding to the original is cut out from the read image and the rotation processing is performed on the cut-out image.

11. The image processing method according to claim 10, wherein in the performing step in the process implemented in the implementing step by the one or more processors, an image of a region corresponding to the original is cut out by an original edge of the original being extracted by using an original edge extraction filter corresponding to the inclination.

12. The image processing method according to claim 8, wherein in the performing step in the process implemented in the implementing step by the one or more processors, a region corresponding to the original is specified in the read image.

13. An image processing method comprising:
an implementing step of implementing a process by one or more processors by executing program codes stored in a storage medium,
wherein the process includes:
an acquisition step of acquiring a read image acquired by a reading device reading an original;
a specifying step of specifying a region in which the luminance is higher than a predetermined luminance, which corresponds to a frequency component equal to or greater than a predetermined frequency, and in which the a flatness of a power spectrum existent region is equal to or greater than a predetermined threshold value, from the read image acquired in the acquisition step, and of specifying a direction of fiber in the specified region, and
a performing step of performing predetermined processing on the read image based on the specified direction of the fiber in the region specified in the specifying step.

14. A non-transitory computer readable storage medium storing a program for causing a computer to perform as the image processing apparatus according to claim 1.

15. The image processing apparatus according to claim 6, wherein the one or more processors as the performing unit detects the inclination of the original in the read image in accordance with the direction of the fiber as the predetermined processing.

16. The image processing apparatus according to claim 15, wherein the one or more processors as the performing unit further performs rotation processing of the read image based on the inclination as the predetermined processing.

17. The image processing method according to claim 13, wherein in the performing step in the process implemented in the implementing step by the one or more processors, the inclination of the original in the read image is detected in accordance with the direction of the fiber as the predetermined processing.

18. The image processing method according to claim 17, wherein in the performing step in the process implemented in the implementing step by the one or more processors, rotation processing of the read image is further performed based on the inclination as the predetermined processing.

* * * * *